US011952099B2

(12) United States Patent
Blom-Schieber et al.

(10) Patent No.: US 11,952,099 B2
(45) Date of Patent: Apr. 9, 2024

(54) AIRCRAFT WINDOW ASSEMBLIES AND RELATED METHODS

(71) Applicant: The Boeing Company, Chicago, IL (US)

(72) Inventors: Adriana Willempje Blom-Schieber, Snohomish, WA (US); Gabriela DeFrancisci, Edmonds, WA (US)

(73) Assignee: The Boeing Company, Arlington, VA (US)

( * ) Notice: Subject to any disclaimer, the term of this patent is extended or adjusted under 35 U.S.C. 154(b) by 267 days.

(21) Appl. No.: 17/369,843

(22) Filed: Jul. 7, 2021

(65) Prior Publication Data

US 2023/0009680 A1    Jan. 12, 2023

(51) Int. Cl.
  *B64C 1/14*    (2006.01)
  *B29C 70/42*   (2006.01)
  (Continued)

(52) U.S. Cl.
  CPC ............ *B64C 1/1484* (2013.01); *B29C 70/42* (2013.01); *B29C 70/68* (2013.01); *B64C 1/1492* (2013.01);
  (Continued)

(58) Field of Classification Search
  CPC ................ B64C 1/1484; B64C 1/1492; B29L 2031/3076
  See application file for complete search history.

(56) References Cited

U.S. PATENT DOCUMENTS 5,988,566 A * 11/1999 Meyer ................... B64C 1/1492
                                                49/504
6,905,094 B2 * 6/2005 Dazet .................... B64C 1/1492
                                               244/129.1
(Continued)

FOREIGN PATENT DOCUMENTS

EP      3199448 A1     8/2017
WO   2005115836 A1    12/2005
WO   2015019047 A1     2/2015

OTHER PUBLICATIONS

Gardiner, "Overmolding as Enabler for Composites, Aerospace to Automotive," https://compositesworld.com/articles/overmolding-as-enabler-for-composites-aerospace-to-automotive, *CompositesWorld*, Jan. 26, 2018.
(Continued)

*Primary Examiner* — Michael H Wang
(74) *Attorney, Agent, or Firm* — Kolitch Romano Dascenzo Gates LLC

(57) ABSTRACT

Aircraft window assemblies and methods. The aircraft window assemblies comprise a window frame configured to support a window pane on an aircraft skin about a window aperture defined in an aircraft skin. The window frame includes a base formed of a continuous fiber reinforced thermoplastic composite and at least one overmolded feature molded to the base. The base defines a central aperture and includes circumferential flange portion configured to support the base on the aircraft skin surrounding the window aperture and a skirt portion extending inwardly from the circumferential flange portion and surrounding the central aperture. The skirt portion is non-planar with the circumferential flange portion and comprises a support surface for the window pane. The methods comprise forming the window frame, which comprises stamp-forming the base of the window frame from a continuous fiber reinforced thermo-
(Continued)

plastic composite sheet and overmolding the at least one overmolded feature to the base.

20 Claims, 6 Drawing Sheets

(51) Int. Cl.
B29C 70/68 (2006.01)
B29K 101/12 (2006.01)
B29L 31/30 (2006.01)

(52) U.S. Cl.
CPC ... *B29K 2101/12* (2013.01); *B29L 2031/3076* (2013.01)

(56) References Cited

U.S. PATENT DOCUMENTS

| | | | | |
|---|---|---|---|---|
| 7,988,094 B2* | 8/2011 | Ostrem | ................ | B29C 70/462 244/121 |
| 8,449,709 B2* | 5/2013 | Modin | ................ | B32B 38/0004 264/258 |
| 9,682,766 B2* | 6/2017 | Apdalhaliem | ........ | B64C 1/1484 |
| 2007/0194177 A1* | 8/2007 | Coak | .................... | B64C 1/1492 244/129.3 |
| 2008/0169380 A1* | 7/2008 | Jackson | ................ | B64C 1/1492 244/129.3 |
| 2012/0119031 A1* | 5/2012 | Ainsworth | ............ | B64C 1/1492 156/91 |
| 2013/0043348 A1* | 2/2013 | Milliere | ................ | B64C 1/1492 156/91 |
| 2014/0314973 A1* | 10/2014 | Desroches | ............ | B64C 1/1484 428/34 |
| 2014/0319276 A1* | 10/2014 | Yokoi | .................... | B64C 1/1492 244/129.3 |
| 2016/0208090 A1* | 7/2016 | Wood | ....................... | B32B 27/12 |
| 2016/0362168 A1* | 12/2016 | Busscher | .............. | B64C 1/1484 |
| 2016/0368585 A1* | 12/2016 | Farouz-Fouquet | ..... | B29C 45/44 |
| 2017/0217560 A1* | 8/2017 | Gideon | ................. | B64C 1/1492 |
| 2020/0102062 A1* | 4/2020 | Blom-Schieber | ........................... B29D 99/0014 |
| 2020/0139643 A1 | 5/2020 | Ogale | | |

OTHER PUBLICATIONS

Thermoplastic Composites Research Center, "Advanced Forming and Overmolding Technology," https://tprc.nl/researches/advanced-forming-and-overmolding-technology, accessed Jul. 14, 2022.
Thermoplastic Composites Research Center, "New Project on Overmolding," https://tprc.nl/news/compete-iii-project, accessed Jul. 14, 2022.
Thermoplastic Composites Research Center, Automated One-Step Overmolding COMPeTE project webpage, https://tprc.nl/news/check-out-our-video-on-automated-one-step-overmolding-of-cpeek, accessed Jul. 14, 2022.
YouTube—Thermoplastic Composites Research Center, "Automated One-Step Overmolding Process for C/PEEK," https://youtube.com/watch?v=T-PJgCPNt9Q, Jan. 18, 2018.
YouTube-Victrex, "Victrex Hybrid Moulding Technology," https://youtube.com/watch?v=ydMmN8A5pWY, Sep. 29, 2015.
European Patent Office, Extended European Search Report in related EP application, dated Oct. 20, 2022.

* cited by examiner

AIRCRAFT WINDOW ASSEMBLIES AND RELATED METHODS

FIELD

The present disclosure relates to aircraft window assemblies and related methods.

BACKGROUND

Generally speaking, aircraft include an aircraft skin that encloses or surrounds an interior volume, which may be utilized to carry the flight crew, passengers, and cargo, as well as various aircraft systems and components. Typically, aircraft include aircraft windows that permit visual access from the interior volume to the surroundings of the aircraft. An aircraft window usually is formed with a window aperture that extends through the aircraft skin. A typical aircraft window includes a window assembly having a window frame that is supported on an interior or inside surface of the aircraft skin about the window aperture and a window pane that is supported on and positioned by the window frame to extend across at least a substantial portion of the window aperture. The window frame typically includes a flange portion that is supported on the aircraft skin and a lip portion extending inwardly and out of plane from the flange portion that forms a support surface for the window pane. The window assembly also may include a window pane retention system that holds the window pane against the window frame.

In recent years, the window frames of aircraft window assemblies increasingly are being formed from continuous fiber reinforced composites due to their superior weight and mechanical properties relative to metal alloys. Existing window frames formed from continuous fiber reinforced composites typically have complex doubly-curved geometry, with a tightly curved perimeter that follows the window aperture and two bends with tight radii in the cross-section, that orient and position the flange and lip portions to support the window pane at the correct position relative to the aircraft skin and window aperture. The tight radii of curvature required in these structures can cause wrinkling of the reinforcing fibers during manufacture, which can affect the strength of the window frame. Additionally, these structures frequently require additional parts in window pane retention systems as compared to conventional alloy-based window frames. Thus, a need exists for improved aircraft window assemblies having continuous fiber reinforced composite window frames that may include improved strength characteristics and/or require fewer parts.

SUMMARY

The present disclosure relates to aircraft window assemblies and methods of forming window frames. The aircraft window assemblies comprise a window frame configured to support a window pane on an aircraft skin about a window aperture defined in the aircraft skin and to align the window pane with the window aperture. The window frame comprises a base formed of a continuous fiber reinforced thermoplastic composite and at least one overmolded feature molded to the base. The base is ring shaped and defines a central aperture. The base comprises a skirt portion and a circumferential flange portion. The circumferential flange portion defines a radial exterior of the base and is configured to support the base on the aircraft skin surrounding the window aperture. The skirt portion extends radially inwardly from the circumferential flange portion and surrounds the central aperture. The skirt portion is non-planar with the circumferential flange portion and comprises a support surface for supporting the window pane of the aircraft window assembly. The at least one overmolded feature may comprise an overmolded protruding rib molded along an interior face of the base and/or an overmolded aero filler molded along an exterior face of the skirt portion.

The methods comprise forming the window frame, which comprise stamp-forming the base of the window frame from a sheet of continuous fiber reinforced thermoplastic composite and overmolding the at least one overmolded feature to the base.

BRIEF DESCRIPTION OF THE DRAWINGS

FIGS. 1-6 provide examples of aircraft window assemblies 100, aircraft 10 including aircraft window assemblies 100, window frames 102 of aircraft window assemblies 100, and methods 500 of forming window frames 102 according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be comprised in and/or utilized with any of FIGS. 1-6 without departing from the scope of the present disclosure.

Generally, in the figures, elements that are likely to be comprised in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure. Additionally, in schematic FIGS. 2 and 3, virtual features, such as axes, dimensions, etc. that may be defined by window assemblies, aircraft, and/or window frames according to the present disclosure are indicated in dash-dot lines, and these virtual features may or may not be optional to the illustrated embodiment. Also in schematic FIGS. 2 and 3, dotted lines are utilized to indicate structure, elements, regions, and/or spaces that may be environment to and/or utilized in conjunction with aircraft window assemblies 100.

Figure 1:
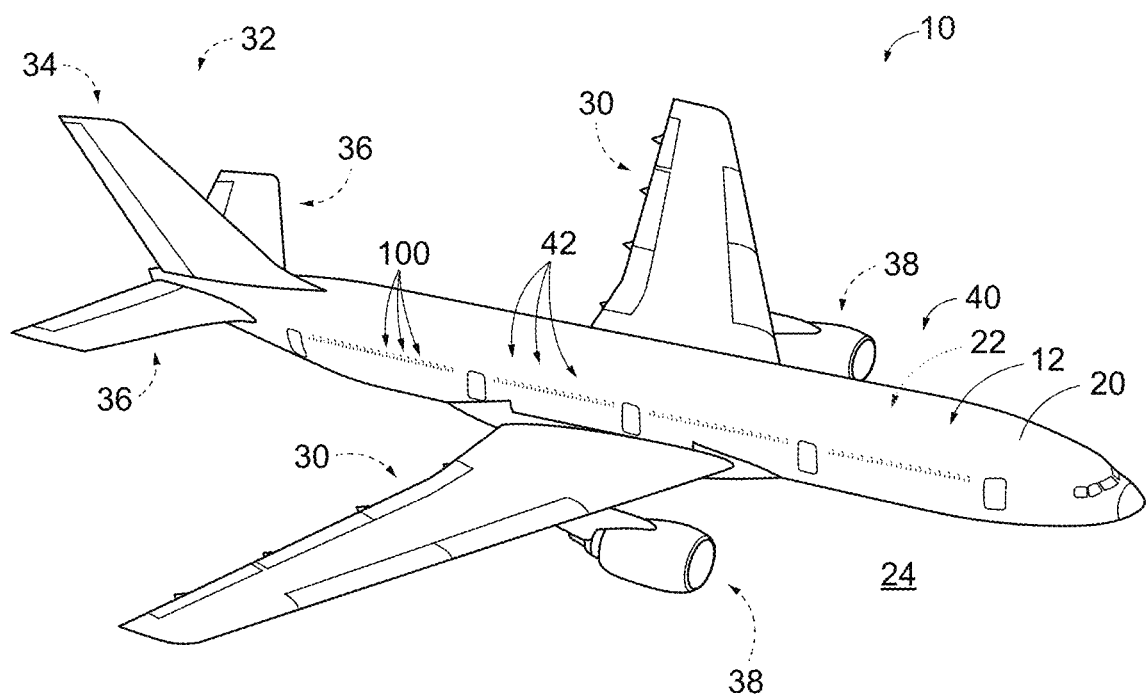
FIG. 1 is an illustration representing example aircraft that comprise a plurality of aircraft window assemblies according to the present disclosure.

FIG. 1 is an illustration of examples of aircraft 10 that comprise a plurality of aircraft window assemblies 100, according to the present disclosure. Examples of aircraft window assemblies 100 are illustrated in FIGS. 2-5 and discussed in more detail herein with reference thereto. Aircraft 10 comprise an aircraft skin 12 that surrounds an internal volume that is referred to herein as an aircraft interior 22. Aircraft skin 12 at least partially separates aircraft interior 22 from a region 24 exterior to aircraft 10. Aircraft 10 may comprise a fuselage 40 that defines, or surrounds at least a portion of aircraft interior 22. Aircraft 10 also may comprise at least one wing 30, a tail assembly 32, and at least one engine 38. Each wing 30 may be operatively attached to and/or extend from fuselage 40. Engine 38 also may be operatively attached to fuselage 40 such as via a corresponding wing 30. Tail assembly 32 may be operatively attached to and/or may be at least partially defined by fuselage 40. Tail assembly 32 may comprise at least one vertical stabilizer 34 and/or at least one horizontal stabilizer 36.

Aircraft 10 further comprises a plurality of aircraft windows 42. Each aircraft window is formed with a window aperture 14 that is defined in aircraft skin 12 and forms an opening between aircraft interior 22 and region 24 exterior to aircraft 10. A plurality of, and optionally each of, aircraft windows 42 comprises aircraft window assembly 100. That said, in some examples of aircraft 10, one or more aircraft windows 42 comprise an aircraft window assembly that is different from aircraft window assemblies 100 according to the present disclosure.

Each aircraft window assembly 100 is operatively attached to aircraft skin 12 around a corresponding window aperture 14. Each aircraft window assembly 100 is configured span the respective window aperture 14 to partition, or sealably partition, aircraft interior 22 from region 24 exterior to aircraft 10. Thus, aircraft skin 12 and aircraft window assembly(s) 100 may be described as collectively being configured to completely separate, or sealably separate, aircraft interior 22 from region 24 exterior to aircraft 10. In some examples, at least some of, and optionally all of, aircraft windows 42 are disposed along fuselage 40.

Aircraft 10 may comprise any suitable type of aircraft with examples including private aircraft, commercial aircraft, passenger aircraft, military aircraft, jetliners, wide-body aircraft, and/or narrow body aircraft. While FIG. 1 shows an example in which aircraft 10 is a fixed wing aircraft, aircraft window assemblies 100 may be comprised in and/or utilized with any other suitable type of aircraft such as rotor craft and/or helicopters.

Figure 2:
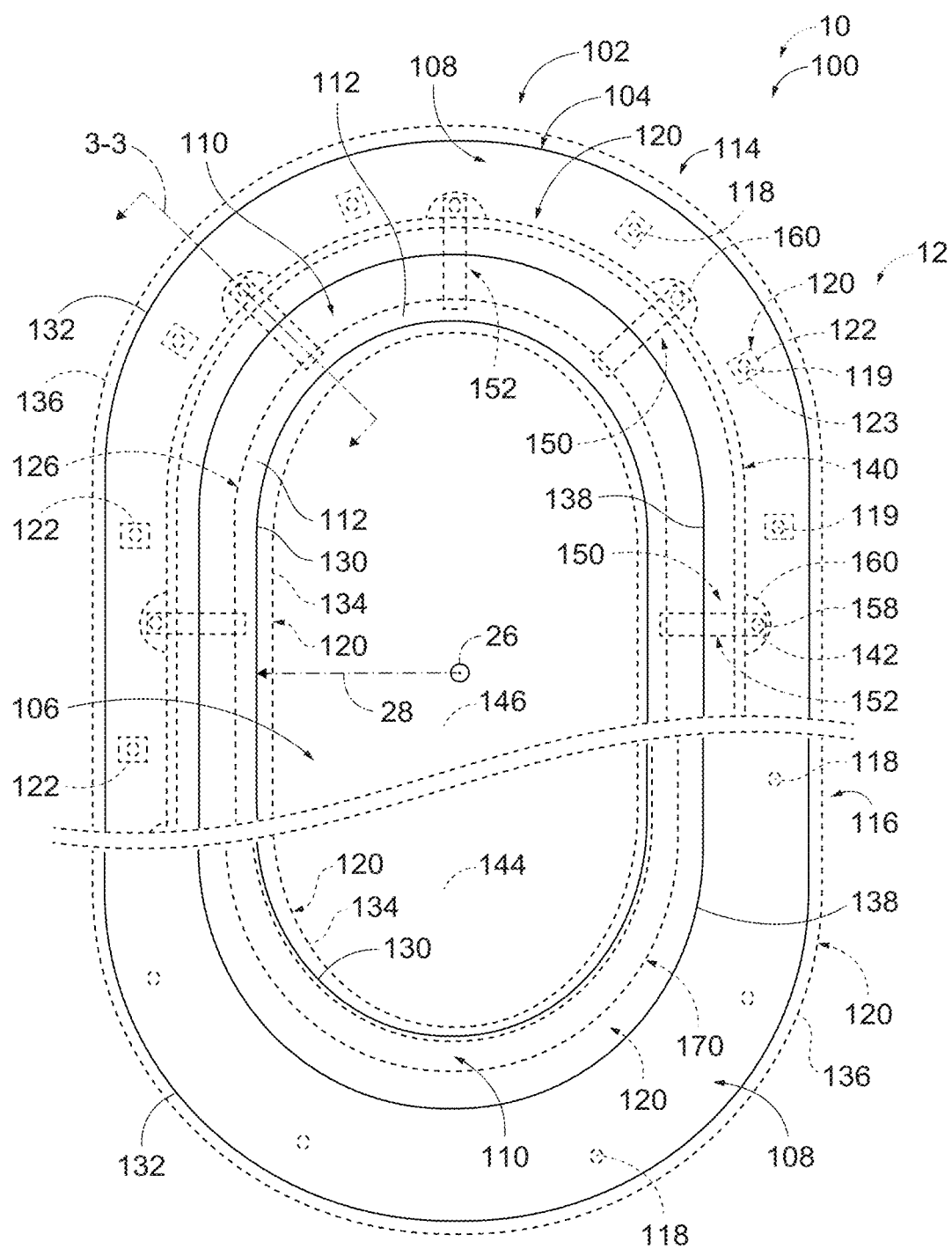
FIG. 2 is a schematic representation showing examples of aircraft window assemblies according to the present disclosure.
Figure 3:
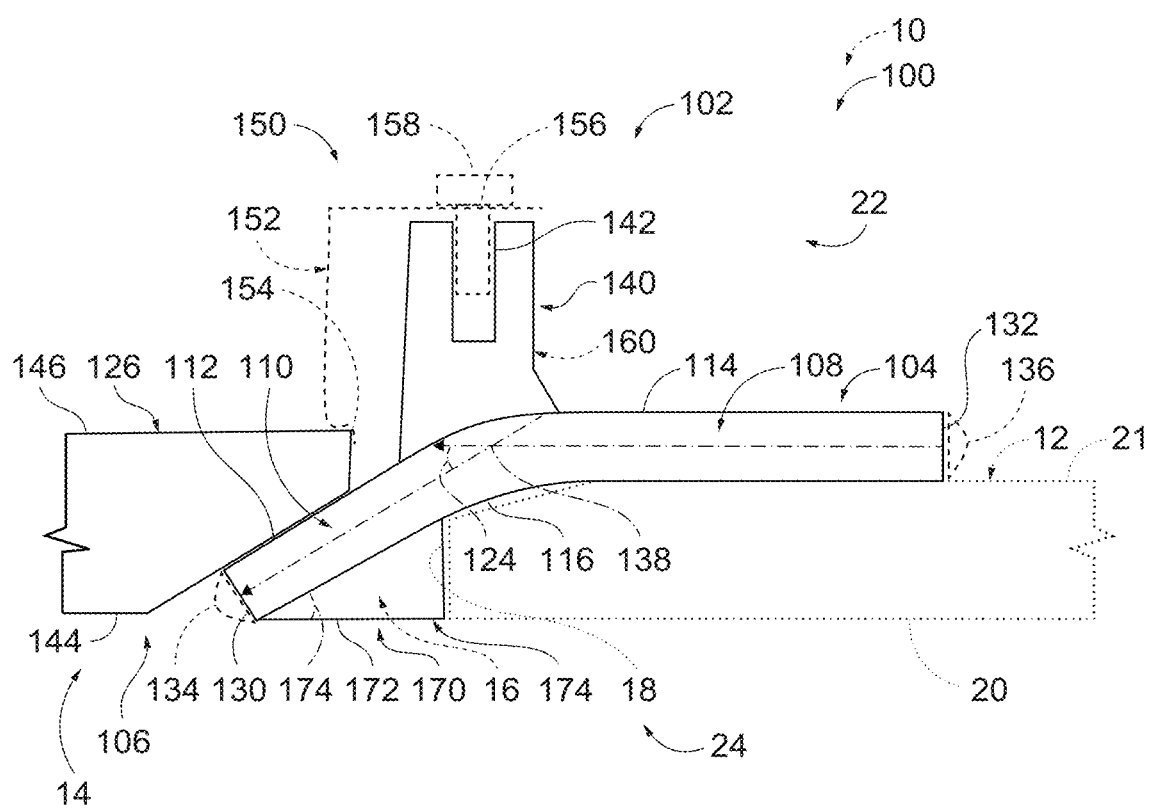
FIG. 3 is a schematic cross-sectional view taken along line 3-3 of FIG. 2 showing somewhat less schematic examples of window assemblies according to the present disclosure.

FIG. 2 is a schematic representation showing examples of aircraft window assemblies 100 according to the present disclosure. FIG. 3 is a schematic cross-sectional view taken along line 3-3 of FIG. 2 and showing examples of aircraft window assemblies 100 that comprise an overmolded aero filler 170 and an overmolded protruding rib 140, as discussed in more detail herein. However, as shown in FIG. 1 overmolded aero filler 170 and overmolded protruding rib 140 are not required in all examples of aircraft window assemblies 100 according to the present disclosure.

As shown in the examples of FIGS. 2 and 3, aircraft window assemblies 100 comprise a window frame 102 configured to support a window pane 126 on aircraft skin 12 about window aperture 14 defined in aircraft skin 12. Window frame 102 comprises a base 104 formed of a continuous fiber reinforced thermoplastic composite and at least one overmolded feature 120 molded to base 104. Base 104 is ring-shaped and defines a central aperture 106. Base 104 comprises a circumferential flange portion 108 and a skirt portion 110. Circumferential flange portion 108 defines a radial exterior of base 104 and is configured to support base 104 on a portion of aircraft skin 12 that surrounds window aperture 14. Skirt portion 110 extends radially inwardly from circumferential flange portion 108 and surrounds central aperture 106. Skirt portion 110 is non-planar with circumferential flange portion 108 and comprises a support surface 112 for supporting window pane 126. Window pane 126 is dimensioned and shaped to extend across central aperture 106, to be seated on support surface 112, and to provide a partition across central aperture 106. Skirt portion 110 additionally or alternatively may be referred to herein as frame lip 110.

Central aperture 106 may have any suitable shape, such as a circular, ovular, elliptical, and/or rounded rectangular shape. Window pane 126 also may have any suitable shape, such as a circular, ovular, elliptical, and/or rounded rectangular shape that may correspond to, or at least substantially correspond to, that of central aperture 106. Window pane 126 may comprise a pane exterior surface 146 that is configured to face region 24 exterior to aircraft 10 and a pane interior surface 144 that is configured to face aircraft interior 22. In some examples, window pane 126 is curved such that pane interior surface 144 is concave and pane exterior surface 146 is convex.

In some examples, window frame 102, and/or base 104 thereof, comprises an interior face 114 that is configured to face aircraft interior 22 and an exterior face 116 that is configured to face region 24 exterior to aircraft 10. In FIG. 2, interior face 114 of window frame 102 illustrated above the schematic cut line, and exterior face 116 of window frame 102 is illustrated below the schematic cut line. For purposes of illustration, aircraft skin 12 is omitted from the portion of FIG. 2 below the schematic cut line. In some examples, exterior face 116 of circumferential flange portion 108 is configured to operatively contact aircraft skin 12 and support aircraft window assembly 100 on aircraft skin 12. More specifically, in some examples, aircraft skin 12 comprises a skin exterior surface 20 that faces region 24 exterior to aircraft 10 and a skin interior surface 21 that is opposed to skin exterior surface 20 and that faces aircraft interior 22. In some such examples, exterior face 116 of circumferential flange portion 108 is configured to operatively contact skin interior surface 21. As used herein, "operatively contact" does not require direct physical engagement, as a gasket, O-ring, adhesive, or other material may be positioned directly between exterior face 116 of circumferential flange portion 108 and skin interior surface 21. In some examples, support surface 112 is included in interior face 114 of skirt portion 110. In other words, window pane 126 may be supported on interior face 114 of skirt portion 110.

As shown in FIG. 2, aircraft window assembly 100 may define a central axis 26 that extends through the geometric or symmetrical center of central aperture 106 and generally along a direction between interior face 114 and exterior face 116. The distance of a given portion, surface, feature, and/or region of window frame 102 from central axis 26 may be defined herein with a circumferential radius 28 that originates at central axis and extends normal to central axis 26. In some examples, the distance of given portion, surface, feature, and/or region of window frame 102 from central axis 26 along circumferential radius 28 varies with respect to rotation about central axis 26. In view of the above, circumferential flange portion 108 being discussed herein as defining the radial exterior of base 104 refers to circumferential flange portion 108 being the portion of base 104 that extends with the largest average circumferential radius 28 from central axis. Also as discussed herein, a first portion, surface, feature, and/or region of window frame 102 may be described as being inside of a second portion, surface, feature, and/or region of window frame 102 when it is positioned closer to central axis 26. In the same situation, the second portion, surface, feature, and/or region of window frame 102 may be described as being outside of the first portion region, surface, feature, and/or region.

Central axis 26 additionally or alternatively may be defined as extending normal to a plane along which circumferential flange portion 108 extends. More specifically, circumferential flange portion 108 may be regarded as having a planar configuration for the purpose of discussing relative dimensions of aircraft window assembly 100 and/or positionality therein. However, as illustrated in FIG. 1, aircraft skin 12 is curved in one or more directions such as to surround aircraft interior 22. With this in mind, in some examples, circumferential flange portion 108 and/or window frame 102 possess a global curvature that is configured to match, or to be at least substantially equivalent to, the local curvature of aircraft skin 12 surrounding window aperture 14.

In other words, while circumferential flange portion 108 may be discussed herein as having a planar configuration with regard to the relative dimensions of aircraft window assembly 100, in some examples, circumferential flange portion 108 is, in reality, curved to match the local curvature of aircraft skin 12, and/or skin interior surface 21 thereof, about window aperture 14. The local curvature of aircraft skin 12, and correspondingly the global curvature of circumferential flange portion 108 and/or window frame 102, may vary depending upon the size, shape, and/or type of aircraft 10 and/or the location that aircraft window assembly 100 is installed along aircraft skin 12. In some more specific examples, exterior face 116 of window frame 102, and/or base 104 thereof, comprises a convex global curvature and interior face 114 of window frame 102, and/or base 104 thereof, comprises a concave global curvature.

In view of the above, skirt portion 110 being described herein as "non-planar" with circumferential flange portion 108 is not intended to indicate that circumferential flange portion 108 comprises a planar configuration, but instead that skirt portion 110 diverges from circumferential flange portion 108 with circumferential flange portion 108 and skirt portion 110, each optionally being shaped with the global curvature. In other words, the relative dimensions of aircraft window assembly 100 discussed herein with regard to circumferential flange portion 108 having a planar configuration simply may be mapped onto the global curvature of window frame 102, and/or base 104, and this global curvature may be selected based upon the size of aircraft window assembly 100, the type and/or size of aircraft 10, and/or the location of window assembly within aircraft 10.

As mentioned, base 104 is formed of a continuous fiber reinforced thermoplastic composite. In some examples, the continuous fiber reinforced thermoplastic composite comprises a thermoplastic matrix material and at least one layer of, and optionally a plurality of layers of, continuous reinforcing fibers embedded in the thermoplastic matrix material. In some examples, the continuous reinforcing fibers of a given layer are arranged in a unidirectional relationship. Additionally or alternatively, in some examples the continuous reinforcing fibers of given layer are woven into a fabric. The thermoplastic matrix material comprises at least one, and optionally a mixture of more than one, thermoplastic polymer that binds together with the continuous reinforcing fibers. Examples of suitable thermoplastic polymers for forming the thermoplastic matrix material comprise low-melt polyaryletherketone (PAEK) polymers, polyphenylene sulfide (PPS), polyether ether ketone (PEEK), and/or polyetherketoneketone (PEKK). Examples of suitable continuous reinforcing fibers comprise carbon fibers, glass fibers, boron fibers, ultra-high molecular weight polyethylene fibers, aramid fibers, and/or para-aramid fibers (e.g., KEVLAR™)

In some examples, base 104 is constructed of multiple layers, or plies, of the continuous fiber reinforced thermoplastic composite. In some such examples, the plies are pre-preg plies, which are layers of the composite that include the thermoplastic matrix material and a layer of continuous fibers. Accordingly, in some examples, multiple pre-preg plies are layered to collectively define a blank, or sheet, of the continuous fiber reinforced composite material having desired properties and characteristics. To more permanently affix adjacent layers of plies together, the layered plies may be compacted, or compressed, together with heat, utilizing any suitable method and at any suitable and various times during the construction of the continuous fiber reinforced thermoplastic composite. This compression of two more layers is referred to as compaction, or as compacting, of the plies, or layers, of fibers that are pre-impregnated with the thermoplastic matrix material. Additionally or alternatively, in some examples, the continuous fibers are comingled with filaments or fibers of the thermoplastic matrix material and formed or woven into a mat that is consolidated with heat and pressure. As another example, the continuous fibers are powder coated with a powder of the thermoplastic matrix material and formed or woven into a fabric that is consolidated with heat and pressure.

As mentioned, window frame 102 comprises at least one, and optionally a plurality of, overmolded features 120 molded to base 104 In some examples, overmolded feature 120 is configured to replace and/or supplement one or more external structures utilized in conventional aircraft window assemblies that is operatively attached to a window frame thereof. Additionally or alternatively, in some examples, overmolded feature 120 is configured to permit base 104 to be shaped with geometries that are not possible in conventional composite aircraft window assemblies. As discussed in more detail herein, more specific examples of overmolded features 120 that may be comprised in window frame 102 include an overmolded protruding rib 140, an overmolded aero filler 170, an inside edge overmold 134, an outside edge overmold 136, and/or a plurality of overmolded protrusions 122. Window frame 102 may comprise at least one of, any suitable combination of two or more of, and/or each of overmolded protruding rib 140, overmolded aero filler 170, inside edge overmold 134, outside edge overmold 136, and/or overmolded protrusions 122.

Each overmolded feature 120 is formed of an overmolding material that may comprise an overmolding matrix material, and optionally reinforcing elements embedded in the overmolding matrix material. In some examples, the overmolding matrix material is formed of at least one, and optionally a mixture of more than one, thermoplastic polymer. More specific examples of suitable thermoplastic polymers for forming the overmolding matrix material comprise low-melt polyaryletherketone (PAEK) polymers, polyphenylene sulfide (PPS), polyether ether ketone (PEEK), and polyetherketoneketone (PEEK).

The overmolding matrix material may be the same as or different from the thermoplastic matrix material of base 104. Generally speaking, the overmolding matrix material is selected to be compatible with the thermoplastic matrix material of base 104 such that polymer chains of the overmolding matrix material may intermingle with those of the thermoplastic matrix material to form a bond or connection between overmolded feature 120 and base 104. In some examples, the overmolding material is configured to possess similar, or at least substantially similar, mechanical properties to that of the continuous fiber reinforced thermoplastic composite of base 104 such that overmolded feature(s) 120 and base 104 react to applied loads in a similar manner and/or such as to avoid stress concentration in window frame 102.

Figure 6:
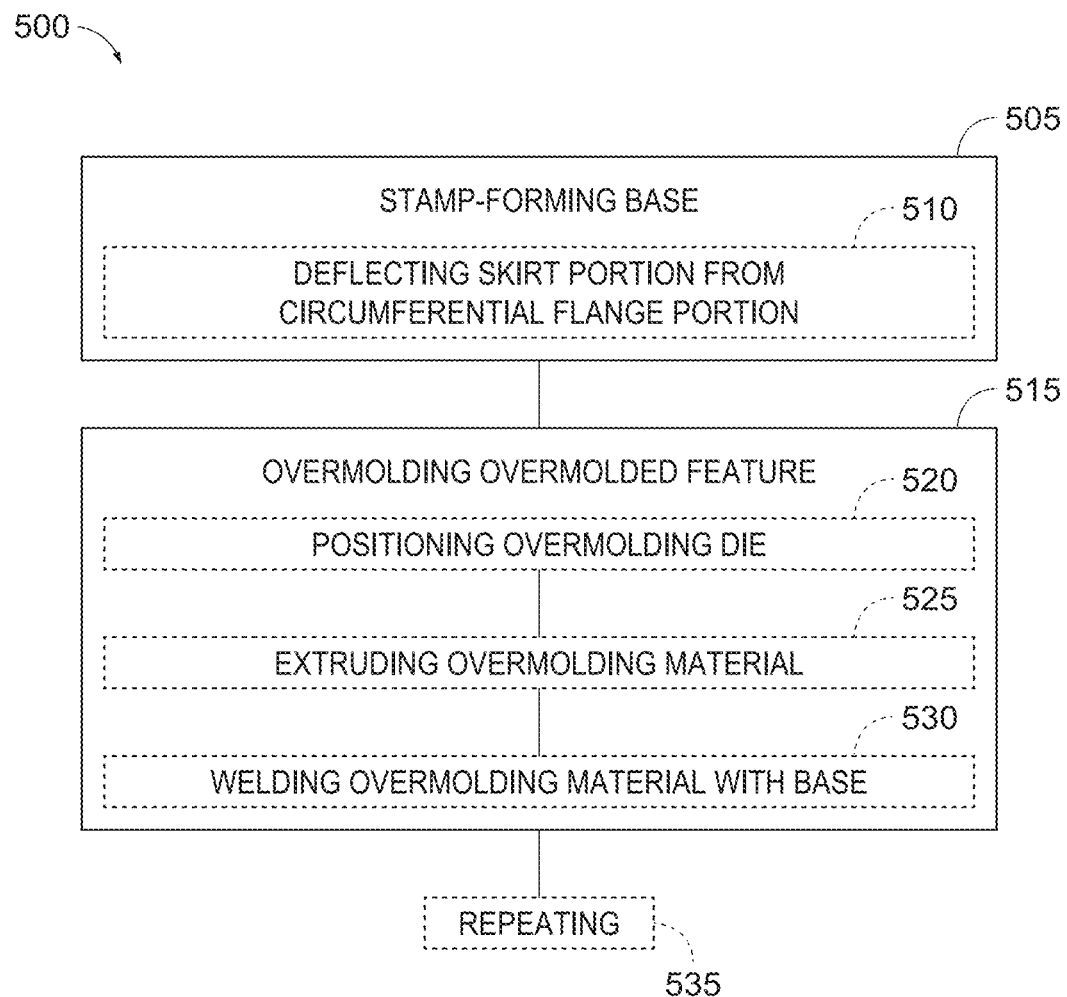
FIG. 6 is a flowchart schematically representing examples of forming window frames according to the present disclosure.

As discussed in more detail herein with reference to FIG. 6 and methods 500, in some examples, overmolded feature 120 is molded to base 104 by melting the overmolding material and fusing, or welding, the overmolded matrix material with a desired region of the base 104. Typically, the desired region of base 104 is melted during the welding process. In some examples, molding of the overmolded feature 120 to the base 104 comprises interdiffusing the overmolding matrix material with the thermoplastic matrix material of base 104 to form a bond or polymer weld therebetween. In some examples, the polymer chains of the overmolding matrix material and those of the thermoplastic matrix material intermingle or interdiffuse such as to form a continuous joint therebetween. Thus, in some examples, overmolded feature 120 is integrally molded with and/or continuous with base 104.

As also discussed in more detail herein, in some examples, overmolded feature 120 is molded to base 104 by extruding the overmolding material onto a desired region of the base 104. With this in mind, for some examples in which the overmolding material comprises reinforcing elements, the reinforcing elements do not comprise continuous fibers. In more specific examples, the reinforcing elements comprise short fibers, chopped fibers, or reinforcing particles. The reinforcing elements are formed of any suitable material, such as the same or different from the materials that form the continuous fibers of the base 104. In some examples, the reinforcing elements are formed of glass or carbon, such as chopped or short glass fibers and/or chopped or short carbon fibers. The length and/or size of the reinforcing elements may be similar to that typically utilized in the art for injection molding. For examples in which window frame 102 comprises a plurality of overmolded features 120, overmolded features 120 may be formed from the same overmolding material or from different overmolding materials that may be selected based upon the specific type of overmolded feature 120.

With continued reference to FIGS. 2 and 3, in some examples, aircraft window assembly 100 comprises a pane retention system 150 that is configured to press window pane 126 against support surface 112 to retain window pane 126 on window frame 102. In some examples, overmolded feature(s) 120 is, or comprises, an overmolded protruding rib 140 that is overmolded along interior face 114 of base 104. Overmolded protruding rib 140 additionally or alternatively may be referred to herein as an overmolded vertical flange 140 and/or overmolded upright flange 140. In some examples, aircraft window assembly 100 comprises a plurality of fastener receivers 142 disposed along overmolded protruding rib 140 and configured to couple pane retention system 150 to window frame 102. In particular, in some examples, pane retention system 150 comprises a plurality of fasteners 158, each being configured to engage a fastener receiver 142. In some examples, fastener receivers 142 comprise threaded inserts that are installed through the interior face 114 of overmolded protruding rib 140. In such example, fasteners 158 comprise threaded fasteners configured to be treaded into the threaded inserts.

In some examples, pane retention system 150 comprises a plurality of pane retention members 152, each being configured to press window pane 126 against support surface 112 of skirt portion 110. In some such examples, fasteners 158 are configured to couple a pane retention member 152 to a respective fastener receiver 142 disposed along overmolded protruding rib 140. In some examples, each pane retention member 152 comprises a pane-contacting end region 154 configured to engage window pane 126 and a fastener-receiving region 156 configured to couple pane retention member 152 to overmolded protruding rib 140 via a respective fastener 158 and fastener receiver 142.

Pane retention system 150 comprises any suitable number of pane retention members 152, such as at least 4, at least 6, at least 8, at least 10, at least 12, at least 14, at least 16, at most 8, at most 10, at most 12, at most 14, at most 16, at most 20, and/or at most 30 pane retention members 152. In some examples, aircraft window assembly 100 has a corresponding number of fastener receivers 142 disposed along overmolded protruding rib 140. In some examples, fastener receivers 142 are spaced apart from one another along the circumference of overmolded protruding rib 140. In this way, pane retention members 152 are positioned to contact circumferentially spaced apart portions of window pane 126 when coupled to fastener receivers 142.

As shown in the examples of FIG. 3, in some examples, overmolded protruding rib 140 protrudes from base 104 transverse to, and/or at least substantially normal to, circumferential flange portion 108. In such examples, overmolded protruding rib 140 is configured to support fastener-receiving region 156 of pane retention member 152 spaced apart from base 104 such that pane retention member 152 is cantilevered from overmolded protruding rib 140. In some examples, pane retention member 152 comprises an inverted L-shape or elbow-shape configuration, in which a first portion of pane retention member 152 extends from fastener-receiving region 156 radially inward towards central axis 26 and a second portion of pane retention member 152 extends towards support surface 112 and terminates as pane-contacting end region 154. Pane retention member 152 additionally or alternatively may be referred to herein as pane retention clip 152.

In some examples, overmolded protruding rib 140 is configured to stiffen base 104 against in-plane and out-of-plane deflections. In particular, overmolded protruding rib 140 may add structural dimension to window frame 102 transverse to circumferential flange portion 108 that strengthens window frame 102 against deflection or bending in directions transverse to circumferential flange portion 108.

Overmolded protruding rib 140 may be molded to any suitable region of base 104 and/or extend along any suitable region of base 104. In some examples, overmolded protruding rib 140 forms a closed ring centered about central axis 26. More specifically, in some examples, overmolded protruding rib 140 extends at a fixed radial distance (i.e., measured along circumferential radius 28) between an inside edge 130 and an outside edge 132 of base 104 to form a ring that extends along interior face 114. In some examples, the ring formed by overmolded protruding rib 140 encircles central aperture 106 and at least a region of skirt portion 110, in which the region of skirt portion 110 extends radially inward from overmolded protruding rib 140 towards central aperture 106. In such examples, the region of skirt portion comprises support surface 112. Stated in slightly different terms, overmolded protruding rib 140 may be molded to base 104 along circumferential flange portion 108 and optionally along a radially exterior region of skirt portion 110. As shown in FIG. 3, in some examples, overmolded protruding rib 140 is molded to base 104 to overlap with an intersection 138 of skirt portion 110 and circumferential flange portion 108 such that overmolded protruding rib 140 is molded to both circumferential flange portion 108 and skirt portion 110. In some examples, overmolded protruding rib 140 is shaped to the global curvature of circumferential flange portion 108 and/or window frame 102.

As shown in FIG. 2, in some examples, overmolded protruding rib 140 comprises a plurality of radially-bulged sections 160. When comprised in overmolded protruding rib 140, radially-bulged sections 160 each comprise an outermost radial dimension that is greater than that of the remainder of overmolded protruding rib 140. More specifically, in some examples, overmolded protruding rib 140 comprises an inside face that faces central axis 26 and an outside face that is opposed to inside face and that faces away from central axis 26. In such examples, the outermost radial dimension of overmolded protruding rib is measured along circumferential radius 28 between the inside face and the outside face of overmolded protruding rib 140. In some examples, radially-bulged sections 160 protrude away from central axis 26, such that the inside face of overmolded protruding rib 140 is smooth while the outside face of overmolded protruding rib 140 extends further from central axis 26 along radially-bulged sections 160.

In some examples, fastener receivers 142 are disposed along radially-bulged sections 160. In some examples, radially-bulged sections 160 are widened relative to the remainder of overmolded protruding rib 140 such as to be dimensioned to accommodate fastener receivers 142 and/or such as to strengthen overmolded protruding rib 140 proximate to fastener receivers 142. As shown in FIG. 2, radially-bulged sections 160 may be spaced apart from one another about the circumference of overmolded protruding rib 140. In some examples, the number of radially-bulged sections comprised in overmolded protruding rib 140 corresponds to the number of pane retention members 152 comprised in pane retention system 150.

With continued reference to FIGS. 2 and 3, skirt portion 110 extends into window aperture 14 when window frame 102 is attached to aircraft skin 12 about window aperture 14. In some examples, base 104 of window frame 102 is configured such that a gap 16 separates skirt portion 110 from aircraft skin 12. In some examples, overmolded feature(s) 120 of window frame 102 is, or comprises, an overmolded aero filler 170 that is molded along exterior face 116 of skirt portion 110 and configured to be positioned within gap 16. In some examples, overmolded aero filler 170 is dimensioned and shaped to at least partially fill gap 16 and/or smooth a transition between aircraft window assembly 100 and skin exterior surface 20 of aircraft skin 12. With this in mind, overmolded aero filler additionally or alternatively may be referred to herein as overmolded smoother 170 and/or overmolded aero smoother 170.

As shown in FIG. 3, gap 16 is comprised in, or positioned within, window aperture 14. In particular, in some examples, aircraft skin 12 comprises an aperture-facing edge 18 that surrounds window aperture 14 and extends between skin interior surface 21 and skin exterior surface 20. In some examples, gap 16 is at least partially defined between aperture-facing edge 18 of aircraft skin 12 and exterior face 116 of skirt portion 110. Thus, in some examples, gap 16 is a ring-shaped void and extends between exterior face 116 of skirt portion 110 and aperture-facing edge 18 of aircraft skin 12 along the entire circumference of skirt portion 110 and/or for all angles about central axis 26. With this in mind, in some examples, overmolded aero filler 170 extends along the entire circumference of skirt portion 110 such as to encircle central aperture 106. Stated another way, in some examples, overmolded aero filler 170 forms a closed ring centered about central axis 26.

In some examples, window frame 102 is dimensioned and shaped such that intersection 138 is positioned adjacent to and/or aligned with aperture-facing edge 18 when window frame 102 is operatively coupled to aircraft skin 12 about window aperture 14. In some such examples, exterior face 116 of skirt portion 110 is non-contacting with aircraft skin 12 and extends into window aperture 14 from, or from adjacent to, aperture-facing edge 18. In some examples, overmolded aero filler 170 extends along exterior face 116 of skirt portion 110 from inside edge 130 of base 104 towards intersection 138. In some examples, overmolded aero filler 170 terminates adjacent to intersection 138 and/or inside of intersection 138 such that overmolded aero filler 170 is positioned closely adjacent to, and optionally non-contacting with, aperture-facing edge 18 of aircraft skin 12.

As perhaps best seen in the examples of FIG. 3, in some examples, skirt portion 110 extends at a ramp angle 124 relative to circumferential flange portion 108. In some examples, at least a substantial portion of, and optionally an entirety of, skirt portion 110 extends at ramp angle 124 relative to circumferential flange portion 108. In other words, in a cross-section of base 104 taken along a plane that comprises central axis 26 and circumferential radius 28, skirt portion 110 may be deflected from, or diverge from, circumferential flange portion 108 at a single bend that is centered at the intersection 138 of circumferential flange portion 108 and skirt portion 110. Stated yet another way, in a cross-section of base 104 taken along a plane that comprises central axis 26 and circumferential radius 28, circumferential flange portion 108 and skirt portion 110 each may extend along at least substantially straight lines towards intersection 138. In some examples, ramp angle 124 is measured at intersection 138 between the lines along which circumferential flange portion 108 and skirt portion 110 respectively extend. In some such examples, support surface 112 also extends at ramp angle 124 relative to circumferential flange portion 108.

As defined herein, ramp angle 124 is zero for a hypothetical configuration in which skirt portion 110 and circumferential flange portion are collinear in the above-mentioned cross-section and increases to 90° for a hypothetical configuration in which skirt portion 110 extends normal to circumferential flange portion. Base 104 may be shaped with any suitable ramp angle 124, with more specific examples of suitable ramp angles 124 including at least 10°, at least 15°, at least 18°, at least 20°, at least 22°, at least 24°, at least 26°, at least 28°, at least 30°, at least 35°, at most 15°, at most 18°, at most 20°, at most 22°, at most 24°, at most 26°, at most 28°, at most 30°, at most 35°, at most 40°, at most 45°, and/or at most 50°.

In some examples, the volume of gap 16 decreases with respect to ramp angle 124. As indicated above, in some examples, overmolded aero filler 170 is dimensioned and shaped to at least substantially fill the volume of gap 16. In some such examples, the volume of overmolded aero filler 170 is selected based upon ramp angle 124, and more particularly, increased for bases formed with smaller ramp angles 124.

In some examples, base 104 is dimensioned and shaped such that skirt portion 110 extends at least substantially through, or entirely through, window aperture 14 such that inside edge 130 of base 104 is aligned with, or at least substantially aligned with, skin exterior surface 20. In some examples, overmolded aero filler 170 comprises a wedge-shaped cross sectional shape in a plane that comprises central axis 26 and circumferential radius 28. In particular, in some examples, overmolded aero filler 170 comprises an exterior surface 172 that is positioned to face the region 24 exterior to aircraft 10 when aircraft window assembly 100 is installed in aircraft, and overmolded aero filler 170 is dimensioned and shaped such that exterior surface 172 is aligned with, is at least substantially aligned with, and/or extends at least substantially parallel to skin exterior surface 20. In some examples, overmolded aero filler 170 is shaped such that exterior surface 172 thereof extends at a deflection angle 174 relative to exterior face 116 of skirt portion 110. In some such examples, the magnitude of deflection angle 174 is selected to be at least substantially the same as a magnitude of ramp angle 124 such that exterior surface 172 extends at least substantially parallel to skin exterior surface 20. In other words, in some examples, deflection angle 174 and ramp angle 124 define opposite angles.

Overmolded aero filler 170 may permit base 104 to be shaped with a smaller degree of curvature between circumferential flange portion 108 and skirt portion 110. In particular, by at least partially filling the gap 16 between exterior face 116 of skirt portion 110 and aircraft skin 12, overmolded aero filler 170 may permit skirt portion 110 to be deflected, or diverge, from circumferential flange portion 108 at a single bend, whereas the base of conventional aircraft window frames that are formed from of continuous fiber reinforced composite materials typically are formed with two bends between the portion that contacts the aircraft skin and the portion that supports the window pane. By filling the gap between exterior face 116 of skirt portion 110 and aircraft skin 12, overmolded aero filler 170 also may permit base 104 to be formed with a smaller radius of curvature in the bend between skirt portion 110 than the bends of conventional aircraft window frames formed from of continuous fiber reinforced composite materials. The smaller number of bends in base 104 and/or the smaller radius of curvature thereof as permitted by overmolded aero filler 170 may reduce wrinkling of the continuous fibers within base 104, which may improve the strength and/or structural integrity thereof.

In some examples, overmolded aero filler 170 is configured to stiffen skirt portion 110 and/or strengthen skirt portion 110 against in-plane and out-of-plane deflections, such as for similar reasons to that discussed herein for overmolded protruding rib 140. In some examples, overmolded aero filler 170 also is configured to strengthen skirt portion 110 for supporting window pane 126. In particular, in some examples, at least a portion of overmolded aero filler 170 is molded to skirt portion 110 immediately opposed to support surface 112 such that overmolded aero filler 170 may provide additional structural backing along the region of skirt portion that directly supports window pane 126. As perhaps best seen in the examples of FIG. 3, pane exterior surface 146 is supported on support surface 112 of skirt portion 110. In some examples, the peripheral region of pane exterior surface 146 that is supported on support surface 112 is beveled or angled. In some such examples, the peripheral region of pane exterior surface 146 is beveled or angled corresponding to ramp angle 125.

With continued reference to FIGS. 2 and 3, in some examples, base 104 comprises an inside edge 130 that extends between interior face 114 and exterior face 116 and that directly interfaces central aperture. In some examples, base 104 additionally or alternatively comprises an outside edge 132 that extends between interior face 114 and exterior face 116 and that extends around circumferential flange portion 108. In some examples, overmolded feature(s) 120 is, or comprise, an inside edge overmold 134 that is molded along inside edge 130, and optionally along the entirety of inside edge 130. Additionally or alternatively, in some examples, overmolded feature(s) 120 is, or comprise, an outside edge overmold 136 that is molded along outside edge 132, and optionally along the entirety of outside edge 132. In such examples, outside edge overmold 136 defines the radial exterior of window frame 102.

In some examples, inside edge overmold 134 and/or outside edge overmold 136 are configured to seal, protect, and/or shield the respective edge of base 104. As an example, for some examples in which the continuous fiber reinforced thermoplastic composite of base 104 comprises continuous carbon fibers, inside edge overmold 134 and/or outside edge overmold 136 are configured to protect base 104 against electromagnetic effects. Additionally or alternatively, in some examples, inside edge overmold 134 and/or outside edge overmold 136 are configured to provide corrosion protection such as for, or to, any metallic structure proximate or in contact with window frame 102 when aircraft window assembly 100 is installed in aircraft 10. In view of the above, for some examples in which the overmolding material of inside edge overmold 134 and/or outside edge overmold 136 comprises reinforcing particles, the reinforcing particles are selected to be non-conducting such as chopped or short glass fibers.

As perhaps best seen in FIG. 2, in some examples, window frame 102 comprises a plurality of window frame fastener bores 118 extending through and spaced apart around circumferential flange portion 108. Window frame fastener bores 118 are configured to receive a respective plurality of window frame fasteners 119 that engage with aircraft skin 12 to retain window frame 102 to aircraft skin 12. In some examples, overmolded feature(s) 120 is, or comprises, a plurality of overmolded protrusions 122, each being molded atop a window frame fastener bore 118. In particular, when window frame 102 comprises overmolded protrusions 122, overmolded protrusions 122 are molded on interior face 114 of circumferential flange portion 108. Each overmolded protrusion 122 is configured to receive and secure a window frame fastener receiver 123 to window frame 102, and window frame fastener receivers 123 are configured to receive and engage a window frame fasteners 119 to retain window frame 102 to aircraft skin 12. In some examples, window frame fastener receivers 123 comprise threaded inserts that are installed into overmolded protrusions 122. In particular, in some examples, the threaded inserts are disposed in, or co-molded with, the overmolded protrusions during overmolding of the overmolded protrusions 122 to the base 104. Alternatively, the threaded inserts may be tapped or otherwise installed in the overmolded protrusions 122 after they are overmolded to the base 104. Window frame 102 may comprise any suitable number of overmolded protrusions 122, such as at least 4, at least 6, at least 8, at least 10, at least 12, at least 14, at least 16, at most 8, at most 10, at most 12, at most 14, at most 16, at most 20, and/or at most 30 overmolded protrusions 122.

Figure 4:
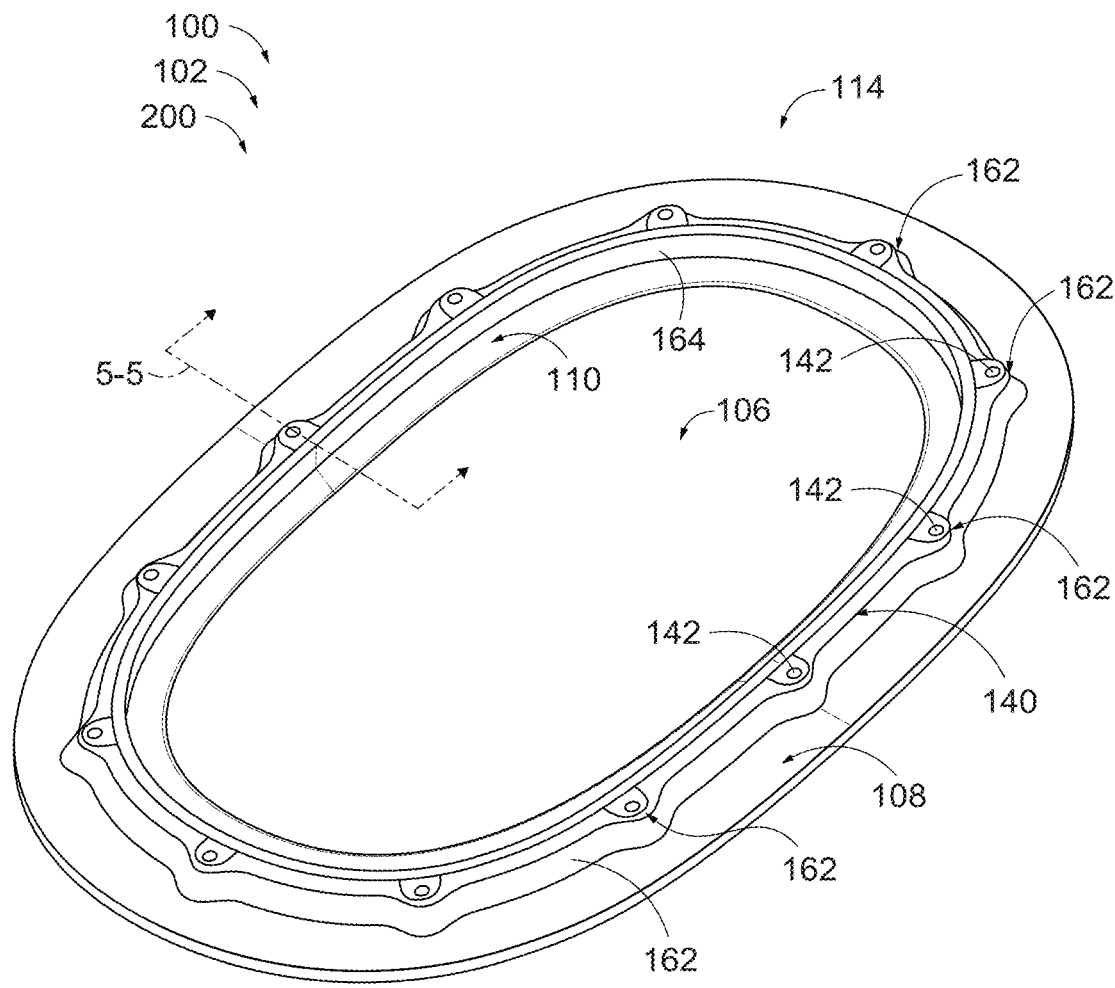
FIG. 4 is an isometric view showing an example window frame of aircraft window assemblies according to the present disclosure.
Figure 5:
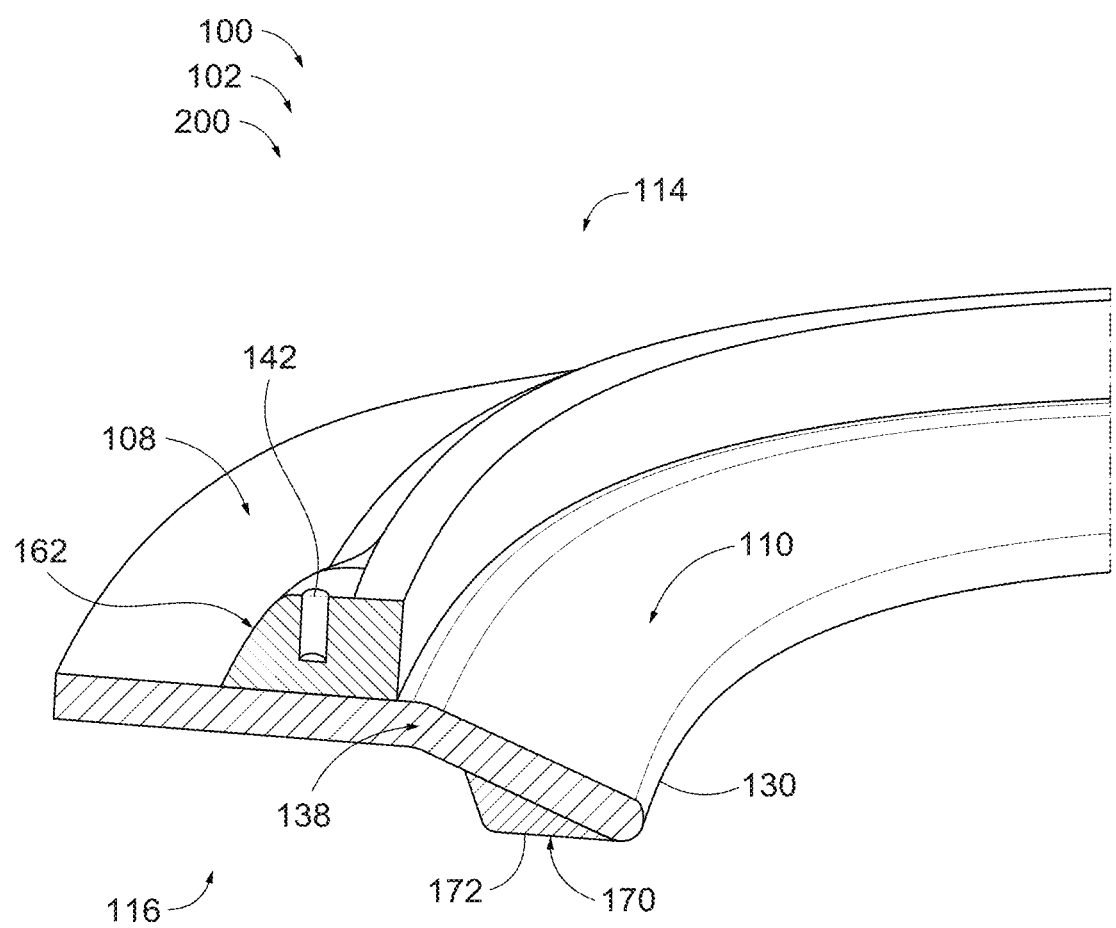
FIG. 5 is a cross-sectional view of the example window frame of FIG. 4 taken along line 5-5 of FIG. 5.

FIGS. 4 and 5 provide an illustrative, non-exclusive example of window frame 102 that is indicated at and referred to herein as window frame 200. Where appropriate, the reference numerals from schematic FIGS. 1-3 are used to designate corresponding parts of the example window frame 102 of FIGS. 4-5; however, window frame 200 is non-exclusive and does not limit aircraft window assemblies 100 and/or window frames 102 thereof to the illustrated embodiments of FIGS. 4-5. That is, aircraft window assemblies 100 and/or window frames 102 thereof may incorporate any of the various aspects, configurations, characteristics, properties, variants, options etc. of aircraft window assemblies 100 and/or window frames 102 thereof 100 that are illustrated in and discussed with reference to the schematic representation of FIGS. 1-3 and/or the embodiment of FIGS. 4-5, as well as variations thereof, without requiring the inclusion of all such aspects, configurations, characteristics, properties, variants, options etc. Furthermore, any additional aspects, configurations, characteristics, properties, variants, options, etc. disclosed in connection with the example window frame 200 of FIGS. 4-5 may be utilized with and/or otherwise comprised in aircraft window assemblies 100 and/or window frame 102 thereof, including those according to FIGS. 1-3. For the purpose of brevity, each previously discussed component, part, portion, aspect, region, etc. or variants thereof may not be discussed, illustrated, and/or labeled again with respect to the example of FIGS. 4-5; however, it is within the scope of the present disclosure that the previously discussed features, variants, etc. may be utilized with the example of FIGS. 4-5.

More specifically, FIG. 4 is an isometric view of window frame 200, and FIG. 5 is a cross-sectional view taken along line 5-5 of FIG. 4. With reference to FIGS. 4 and 5, window frame 200 comprises base 104 having circumferential flange portion 108 and skirt portion 110 extending radially inward from circumferential flange portion 108 to encircle central aperture 106. Skirt portion 110 deflects, or diverges, from circumferential flange portion at a single bend that is centered at the intersection 138 of skirt portion 110 and circumferential flange portion 108. Stated differently, at least a substantial portion of, or the entirety of skirt portion 110 extends at the ramp angle relative to the circumferential flange portion 108 along line 5-5.

Window frame 200 also comprises overmolded protruding rib 140 that extends as a ring along interior face 114 of base 104. Overmolded protruding rib 140 protrudes outwardly from base 104 in a direction that is transverse to, and optionally normal to, circumferential flange portion 108. In this example, overmolded protruding rib 140 is molded to base 104 along, or radially aligned with, intersection 138. Overmolded protruding rib 140 comprises a plurality of radially-bulged sections 160 that are spaced apart from one another along the circumference of overmolded protruding rib 140. Each radially-bulged section 160 protrudes radially outward from an outside face 162 of overmolded protruding rib 140, such that an inside face 164 of overmolded protruding is smooth and/or not bulged. A plurality of fastener receivers 142 are disposed along overmolded protruding rib 140, with each extending into and/or being surrounded by a respective radially-bulged section 160. Each fastener receivers 142 may comprise a threaded bore and/or threaded insert that is set into radially-bulged section 160.

Window frame 200 also comprises overmolded aero filler 170 that is molded along exterior face 116 of skirt portion 110. Overmolded aero filler 170 is wedge-shaped in the cross-section 6-6 shown in FIG. 6 such that the exterior surface 172 extends at least substantially parallel to circumferential flange portion 108. Overmolded aero filler 170 extends from proximate to inside edge 130 of base 104, along exterior face 116 of base 104 towards intersection 138, and terminates radially inside of intersection 138.

FIG. 6 provides a flowchart that represents illustrative, non-exclusive examples of methods 500 of forming a window frame according to the present disclosure. In FIG. 6, some steps are illustrated in dashed boxes indicating that such steps may be optional, or may correspond to an optional version of methods 500 according to the present disclosure. That said, not all methods 500 according to the present disclosure are required to comprise each of the steps illustrated in solid boxes. The methods and steps illustrated in FIG. 6 are not limiting, and other methods and steps are within the scope of the present disclosure, including methods having greater than or fewer than the number of steps illustrated, as understood from the discussion herein.

Methods 500 may be performed to form window frame 102, of aircraft window assemblies 100, that is illustrated and discussed herein with reference to FIGS. 1-5. That is, the window frame formed according to methods 500 and/or discussed herein with reference to FIG. 6 and methods 500 may incorporate any of the features, functions, components, materials etc., as well as variants thereof, as those discussed herein with reference to FIGS. 1-5 without requiring the inclusion of all such features, functions, components, materials etc. Likewise, window frame 102 discussed herein with reference to FIGS. 1-5 may incorporate any of the features, functions, components, materials etc. as those discussed herein with reference to FIG. 6 and methods 500, without requiring the inclusion of all such features, functions, components, materials etc. Where appropriate, the reference numerals from FIGS. 1-5 may be utilized to indicate corresponding parts of the window frames discussed herein with reference to FIG. 6 and methods 500.

Methods 500 comprise stamp-forming a base of the window frame at 505, and overmolding at least one overmolded feature on the base at 515. The stamp-forming at 505 may comprise deflecting a skirt portion of the base from a circumferential flange portion of the base at 510. The overmolding at 515 may comprise positioning an overmolding die at 520, extruding an overmolding material at 525, and welding the overmolding material with the base at 530.

The stamp-forming at 505 comprises stamp-forming the base 104 of the window frame 102 from a sheet of continuous fiber reinforced thermoplastic composite. The sheet of continuous fiber reinforced thermoplastic composite may be formed from any of the material compositions discussed herein with reference to base 104 and FIGS. 2 and 3. As examples, the sheet of continuous fiber reinforced thermoplastic composite may be formed of multiple layers or plies that are compressed together with heat to form the sheet of continuous fiber reinforced thermoplastic composite. In some examples, each ply or layer within the sheet comprises a corresponding layer of continuous fibers embedded therein. The continuous fibers of a given layer may be aligned with one another and/or woven. The continuous fibers of a given layer also may extend at a different orientation relative to the continuous fibers of layers adjacent to the given layer.

In some examples, the stamp-forming at 505 comprises heating the sheet of continuous fiber reinforced thermoplastic composite to soften the continuous fiber reinforced thermoplastic composite, and/or heating the sheet of continuous fiber reinforced thermoplastic composite to or above a softening temperature of the thermoplastic matrix material of the of continuous fiber reinforced thermoplastic composite. As referred to herein, the softening temperature may be defined as a transition temperature of the thermoplastic matrix material at or above which the thermoplastic matrix material is adequately softened and/or malleable to permit mobility of the polymer chains thereof. In some examples, a temperature at or above the softening temperature is suitable to perform welding at 530 of the thermoplastic matrix material of the base 104 with the overmolding matrix material of the at least one overmolding material. The softening temperature is governed by the specific type of thermoplastic matrix material comprised in the base 104. More specific examples of the softening temperature comprise a glass transition temperature of the thermoplastic matrix material, a temperature above the glass transition temperature of the thermoplastic matrix material, a temperature between the glass transition temperature and the melting point of the thermoplastic matrix material, the melting point of the thermoplastic matrix material, and/or a temperature above the melting point of the thermoplastic matrix material.

Thus, in some examples, the stamp-forming at 505 comprises heating the sheet of continuous fiber reinforced thermoplastic composite to, or above, the softening temperature of the thermoplastic matrix material of the of continuous fiber reinforced thermoplastic composite. At least substantially simultaneously with, or subsequent to, the heating, the stamp-forming at 505 may comprise shaping the sheet of continuous fiber reinforced thermoplastic composite into the shape of the base 104. In some examples, the shaping comprises cutting, or stamping, the outside edge 132 of the base 104 from the sheet of continuous fiber reinforced thermoplastic composite. In some examples, the shaping also comprises forming the central aperture 106 within the base 104, such as by cutting, or stamping the inside edge 130 of the base. The shaping also may comprise shaping the base 104 into the global curvature discussed herein.

In more specific examples, the shaping comprises utilizing a stamp press. In some such examples, the stamp press comprises a mold and a stamp die that are brought together to form a space therebetween that defines the desired shape of base 104. In some such examples, the stamp-forming comprises positioning the sheet of continuous fiber reinforced thermoplastic composite between the mold and the stamp die, moving the stamp die towards the mold to press the sheet of continuous fiber reinforced thermoplastic composite into the mold, and compressing the continuous fiber reinforced thermoplastic composite in the mold with the stamp die to form the continuous fiber reinforced thermoplastic composite into the desired shape of the base 104. In some such examples, the mold contacts or supports the exterior face 116 of the base 104 during the shaping and the stamp die contacts or supports the interior face 114 of the base 104 during the shaping.

As shown in FIG. 6, in some examples, the stamp-forming at 505 comprises deflecting a skirt portion of the base 104 from the circumferential flange portion of the base at 510. The deflecting at 510 additionally or alternatively may be described as forming the skirt portion 110 and the circumferential flange portion 108 in the base 104. In some examples, the deflecting at 510 is performed as a portion of the shaping and/or at least substantially simultaneously with or subsequent to the heating. In some examples, the deflecting at 505 comprises forming a bend between the skirt portion and the circumferential flange portion. In some examples, the deflecting at 505 also comprises deflecting the skirt portion 110 from the circumferential flange portion 108 such that the skirt portion 110 extends at the ramp angle relative to the circumferential flange portion. Examples of the suitable ramp angles are disclosed herein.

Methods 500 further comprise overmolding the at least one overmolded feature on the base at 515. The overmolding at 515 may comprise overmolding any of the overmolded features 120 to the base that are discussed herein. As examples, the overmolding at 515 may comprise overmolding the overmolded protruding rib 140, the overmolded aero filler 170, the inside edge overmold 134, and/or the outside edge overmold 136 to the base 104. In some examples, the overmolding at 515 comprises overmolding a plurality of overmolded features 120 to the base. In some examples, the overmolding at 515 comprises overmolding the plurality of overmolded features 120 to the base at least substantially simultaneously with one another. Alternatively, in some examples, the overmolding at 515 comprises overmolding two or more of the overmolded features 120 to the base in a sequential manner.

In some examples, the overmolding at 515 comprises molding the at least one overmolded feature 120 along a respective desired region of the base 104. In such examples, the desired region of the base 104 is selected based upon the particular overmolded feature 120. For some examples in which the at least one overmolded feature 120 comprises the overmolded aero filler 170, the desired region of the base 104 for overmolding the overmolded aero smoother 170 extends circumferentially about the interior face 114 of the skirt portion 110 from the inside edge 103 of the base 104 to a fixed distance from the inside edge 130. For examples in which the at least one overmolded feature 120 comprises the overmolded protruding rib 140, the desired region of the base 104 comprises a ring that extends along the exterior face of the base 104. For some examples in which the at least one overmolded feature 120 comprises the inside edge overmold 134, the desired region of the base 104 comprises the inside edge 130 of the base 104. For some examples in which the at least one overmolded feature comprises the outside edge overmold 136, the desired region of the base comprises the outside edge 132 of the base 104.

As shown in FIG. 6, in some examples, the overmolding comprises positioning an overmolding die in contact with the base at 520. In some examples, the overmolding die comprises an embossed template for the at least one overmolded feature 120. In some examples, the embossed template comprises a void in the shape of the respective overmolded feature with an open face corresponding to the region along which the overmolded feature 120 is molded to the base. In some such examples, the positioning at 520 comprises positioning the overmolded die such that the embossed template for the at least one overmolded feature interfaces and/or is aligned with the desired region of the base 104. In some examples, the overmolding die comprises an embossed template for a plurality of the overmolded features 120, and the positioning at 520 comprises positioning the overmolding die such that the embossed template for each of the plurality of overmolded features interfaces and/or is aligned with the respective desired region of the base 104. Additionally or alternatively, in some examples, the overmolding at 515 comprises utilizing at least two overmolding dies, at least one of which being utilized to form at least one overmolded features 120 formed on the interior face 114 of the base 104 and the other of which being utilized to form an overmolded feature on the exterior face of the base 104.

In some examples, the overmolding die is comprised in the stamp press that is utilized during the stamp-forming at 505. In some such examples, the embossed template for the at least one overmolded feature is formed in the stamp die or the mold. As discussed in more detail herein, in some examples, the overmolding is performed at least substantially simultaneously with the stamp-forming at 505. In a more specific example, the overmolding at 515 comprises utilizing a first overmolding die that is comprised in the mold to overmold the overmolded aero filler 170 to the exterior face 116 of the base 104, and utilizing a second overmolding die that is comprised in the stamp die to overmold the overmolded protruding rib 140 to the interior face 114 of the base 104.

In some examples, the overmolding at 515 further comprises extruding an overmolding material at 525. When the overmolding comprises the extruding at 525, the extruding at 525 comprises extruding the overmolding material from which the at least one overmolded feature 120 is formed into the embossed template such that the overmolding material fills the embossed template and contacts the desired region of the base 104. As such, when comprised in the overmolding at 515, the extruding at 525 is performed subsequent to the positioning at 520. For some examples in which the overmolding at 515 comprises overmolding a plurality of overmolded features 120, the extruding at 525 comprises extruding the overmolding material into each embossed template corresponding to each overmolded feature 120. Also for some examples in which the overmolding at 515 comprises overmolding a plurality of overmolded features 120, the extruding may comprise extruding each overmolded feature 120 at the same or different times from one another.

Generally speaking, the extruding at 525 comprises flowing the overmolded material into the embossed template. As such, the extruding at 525 further comprises melting the overmolded material, heating the overmolded material to or above its melting point, and/or maintaining the overmolding material at or above its melting point during the extruding at 525.

In some examples, the overmolding at 515 comprises welding the at least one overmolded feature with the base along the desired region of the base at 530. When comprised in the overmolding at 515, the welding at 530 comprises welding the overmolding material from which the at least one overmolded feature 120 is formed with the continuous fiber reinforced thermoplastic composite of the base 104. In some examples, the welding at 530 is performed at least substantially simultaneously with the extruding at 525.

As discussed herein, in some examples, the overmolding material is formed of an overmolding matrix material, and optionally reinforcing elements embedded in the overmolding matrix material. In some examples, the welding at 530 comprises fusing and/or forming a thermoplastic bond between the overmolding matrix material and the matrix material of the base 104. In particular, in some examples, the welding at 530 comprises intermingling and/or interdiffusing polymer chains of the overmolding matrix material with those of the matrix material of the base 104. Thus, the welding at 503 additionally or alternatively is referred to as fusing, plastic welding, polymer welding, and/or thermoplastic welding.

Generally speaking, at least the portion of the overmolding material that contacts and/or is immediately proximate to the desired region of the base is liquid, melted, and/or at or above the melting point of the overmolding matrix material during the welding at 530. Also generally speaking, at least the desired region of the base 104, including a subsurface layer beneath the desired region, is melted and/or at or above the softening temperature of the thermoplastic matrix material of the base during the welding at 530, such as to permit intermingling of the polymer chains of the thermoplastic matrix material and the overmolding matrix material.

In some examples, the overmolding at 515 and/or the welding at 530 are performed at least substantially simultaneously with the stamp-forming at 505. In some such examples, the entirety of the base 104 is at or above the softening temperature thereof, such that the welding at 530 occurs automatically during and/or as a part of the extruding at 525. In some such examples, the overmolding matrix material is selected to possess a melting point that is at least substantially the same as or the same as the melting point of the thermoplastic matrix material of the base 104.

Additionally or alternatively, in some examples, the overmolding at 515 and/or the welding at 530 are performed subsequent to the stamp-forming at 505. In some such examples, methods 500 comprise cooling the base 104 below the softening temperature thereof subsequent to the stamp-forming at 505 and prior to the overmolding at 515. In such examples, methods 500 comprise heating at least the desired region of the base 104 prior to, and/or during the overmolding at 515 and/or the welding at 515. In a more specific example, methods 500 comprise selectively heating the desired region of the base 104, for example by utilizing a directed heating technique such as infrared heating and/or laser beam heating, prior to, or during the, overmolding at 515. In some such examples, only the desired region of the base is above the softening temperature of the thermoplastic matrix material during the welding at 530.

For some examples in which the overmolding at 515 and/or the welding at 530 are performed subsequent to the stamp-forming at 505, the overmolding matrix material is selected to possess a melting point that is lower than the melting point and/or softening temperature of the thermoplastic matrix material of the base 104. In such examples, the overmolding at 515 may be performed without softening any undesired region of the base and/or without altering the desired shape of the base 104

In some examples methods 500 comprise repeating at 535. When comprised in methods 500, the repeating at 535 comprises repeating any suitable number, subset, portion, of the steps of methods 500, as well as substeps thereof, in any suitable order. Additionally, the repeating at 535 may comprise repeating any given step, or substep, in the same or in a different manner as originally performed.

In some examples, the repeating at 535 comprises repeating one or more steps of methods 500 an additional time, or a plurality of additional times, to form a single window frame 102. As an example, for some examples in which methods 500 comprises forming a plurality of overmolded features, the repeating at 535 comprises repeating the overmolding at 515 at least once, and optionally a plurality of times, to form the plurality of overmolded features 120. In some examples, the overmolding at 515 comprises overmolding a first subset of overmolded features 120, and the repeating at 515 the overmolding at 515 comprises overmolding a second of overmolded features 120. In some examples, the overmolding at 515 is performed at least substantially simultaneously with the stamp-forming at 505, and the repeating at 535 the overmolding at 515 is performed subsequent to the stamp-forming 505.

In some examples, the repeating at 535 comprises repeating a plurality of steps of methods 500 at least once, and optionally a plurality of times, such as to form a plurality of window frames 102.

Illustrative, non-exclusive examples of inventive subject matter according to the present disclosure are described in the following enumerated paragraphs:

A. An aircraft window assembly (100), comprising:
a window frame (102) configured to support a window pane (126) on an aircraft skin (12) about a window aperture (14) defined in the aircraft skin (12) and to align the window pane (126) with the window aperture (14), wherein the window frame (102) comprises:
a base (104) formed of a continuous fiber reinforced thermoplastic composite, wherein the base (104) is ring-shaped and defines a central aperture (106), and wherein the base (104) comprises:
a circumferential flange portion (108) defining a radial exterior of the base (104) and configured to support the base (104) on the aircraft skin (12) surrounding the window aperture (14);
a skirt portion (110) extending radially inwardly from the circumferential flange portion (108) and surrounding the central aperture (106), wherein the skirt portion (110) is non-planar with the circumferential flange portion (108) and comprises a support surface (112) for supporting the window pane (126) of the aircraft window assembly (100); and
at least one overmolded feature (120) molded to the base (104).

A1. The aircraft window assembly (100) of paragraph A, wherein the base (104) comprises an interior face (114) that is configured to face an aircraft interior (22) of the aircraft (10) and an exterior face (116) that is configured to face a region (24) exterior to the aircraft (10), wherein the exterior face (116) of the circumferential flange portion (108) is configured to contact aircraft skin (12), and wherein the interior face (114) of the skirt portion (110) comprises the support surface (112) of the skirt portion (110).

A2. The aircraft window assembly (100) of any of paragraphs A-A1, further comprising a plurality of window frame fastener bores (118) extending through and spaced-apart around the circumferential flange portion (108) and configured to receive a respective plurality of window frame fasteners (119) to retain the window frame (102) to the aircraft skin (12).

A2.1. The aircraft window assembly (100) of paragraph A2, wherein the at least one overmolded feature (120) comprises a plurality of overmolded protrusions (122), wherein each overmolded protrusion (122) is molded atop a window frame fastener bore (118) of the plurality of window frame fastener bores (118), and wherein each overmolded protrusion is configured to receive a window frame fastener receiver (123), and wherein each window frame fastener receiver (123) is configured to receive and engage a window frame fastener (119) of the plurality of window frame fasteners (119).

A3. The aircraft window assembly (100) or any of paragraphs A-A2.1, wherein the base (104) comprises an inside edge (130) that extends between a/the interior face (114) and the exterior face (116) and that directly interfaces the central aperture (106), and wherein the base (104) further comprises an outside edge (132) that extends between the interior face (114) and the exterior face (116) and that extends around the circumferential flange portion (108).

A3.1. The aircraft window assembly (100) of paragraph A3, wherein the at least one overmolded feature (120) comprises an inside edge overmold (134) that is molded along the inside edge (130) of the base (104), and optionally along an entirety of the inside edge (130).

A3.2. The aircraft window assembly (100) of any of paragraphs A3-A3.1, wherein the at least one overmolded feature (120) comprises an outside edge overmold (136) that is molded along the outside edge (132) of the base (104), and optionally along an entirety of the outside edge (132).

A4. The aircraft window assembly (100) of any of paragraphs A-A3.2, wherein the continuous fiber reinforced thermoplastic composite of the base (104) comprises a thermoplastic matrix material and at least one layer of unidirectional continuous fibers or woven continuous fibers embedded in the thermoplastic matrix material.

A4.1. The aircraft window assembly (100) of paragraph A4, wherein the thermoplastic matrix material comprises one or more of: low-melt polyaryletherketone (PAEK) polymers, polyphenylene sulfide (PPS), polyether ether ketone (PEEK), and polyetherketoneketone (PEEK).

A4.1.1 The aircraft window assembly (100) of any of paragraphs A4-A4.1m wherein the unidirectional continuous fibers or the woven continuous fibers comprise of one or more of carbon fibers, glass fibers, boron fibers, ultra-high molecular weight polyethylene fibers, aramid fibers, and/or para-aramid fibers.

A4.2. The aircraft window assembly (100) of any of paragraphs A4-A4.1, wherein the at least one overmolded feature (120) is formed of an overmolding matrix material, and optionally reinforcing elements embedded in the overmolding matrix material, and wherein the overmolding matrix material is selected to be compatible with the thermoplastic matrix material such that polymer chains of the overmolding matrix material intermingle with those of the thermoplastic matrix material.

A4.2.1. The aircraft window assembly (100) of paragraph A4.2, wherein the overmolding matrix material comprises one or more of: low-melt polyaryletherketone (PAEK) polymers, polyphenylene sulfide (PPS), polyether ether ketone (PEEK), and polyetherketoneketone (PEEK).

A4.2.2. The aircraft window assembly (100) of any of paragraphs A4.2-A4.2.1, wherein the reinforcing elements comprise one or more of short fibers, chopped fibers, or reinforcing particles.

A4.2.3. The aircraft window assembly (100) of any of paragraphs A4.2-A4.2.2, wherein the overmolding matrix material is formed of a thermoplastic polymer.

A4.2.4. The aircraft window assembly (100) of any of paragraphs A4.2-A4.2.3, wherein the reinforcing elements are formed of one or more of carbon and glass.

B. The aircraft window assembly (100) of any of paragraphs A-A4.2.3, wherein the at least one overmolded feature (120) comprises an overmolded protruding rib (140) molded along a/the interior face (114) of the base (104), wherein the aircraft window assembly (100) further comprises a plurality of fastener receivers (142) disposed along the overmolded protruding rib (140) and configured to couple a pane retention system (150) to the window frame (102).

B1. The aircraft window assembly (100) of paragraph B, further comprising the pane retention system (150), wherein the pane retention system (150) comprises a plurality of pane retention members (152) configured to press the window pane (126) against the support surface (112) of the skirt portion (110), wherein each pane retention member (152) of the plurality of pane retention members (152) comprises a pane-contacting end region (154) configured to engage the window pane (126) and a fastener-receiving region (156) configured to couple the pane retention member (152) to a fastener (158) coupled to a fastener receiver (142) of the plurality of fastener receivers (142) disposed along the overmolded protruding rib (140).

B2. The aircraft window assembly (100) of any of paragraphs B-B1, wherein the overmolded protruding rib (140)

forms a ring that encircles the central aperture (106) and at least a region of the skirt portion (110), and wherein the region of the skirt portion (110) extends radially inward from the overmolded protruding rib (140) towards the central aperture (106).

B3. The aircraft window assembly (100) of any of paragraphs B-B2, wherein the overmolded protruding rib (140) comprises a plurality of radially-bulged sections (160) that each comprise an outermost radial dimension that is greater than that of a remainder of the overmolded protruding rib (140), and wherein the plurality of fastener receivers (142) are disposed along the plurality of radially-bulged sections (160).

B4. The aircraft window assembly (100) of any of paragraphs B-B3, wherein the overmolded protruding rib (140) protrudes from the base (104) at least substantially transverse to the circumferential flange portion (108).

B5. The aircraft window assembly (100) of any of paragraphs B-B4, wherein the overmolded protruding rib (140) extends along an intersection (138) of the circumferential flange portion (108) and the skirt portion (110).

B6. The aircraft window assembly (100) of any of paragraphs B-B5, wherein the overmolded protruding rib (140) forms a closed ring centered about a central axis (26) defined by the window frame (102).

B7. The aircraft window assembly (100) of any of paragraphs B-B6, wherein the overmolded protruding rib (140) is configured to stiffen the base (104) against in-plane and out-of-plane deflections.

C. The aircraft window assembly (100) of any of paragraphs A-B_, wherein the skirt portion (110) extends at a ramp angle (124) relative to the circumferential flange portion (108).

C1. The aircraft window of paragraph C, wherein the at least one overmolded feature (120) comprises an overmolded aero filler (170) molded along a/the exterior face (116) of the skirt portion (110), and wherein the overmolded aero filler (170) is configured to be positioned within a gap (16) between the skirt portion (110) and the aircraft skin (12).

C2. The aircraft window assembly (100) of paragraph C1, wherein the gap (16) is comprised in the window aperture (14).

C3. The aircraft window assembly (100) of any of paragraphs C1-C2, wherein the gap (16) is at least partially defined between the exterior face (116) of the skirt portion (110) and an aperture-facing edge (18) of the aircraft skin (12), and wherein a volume of the gap (16) decreases with respect to the ramp angle (124).

C4. The aircraft window assembly (100) of any of paragraphs C1-C3, wherein the overmolded aero filler (170) is dimensioned and shaped to at least substantially fill the gap (16).

C5. The aircraft window assembly (100) of any of paragraphs C1-C4, wherein the overmolded aero filler (170) encircles the central aperture (106).

C6. The aircraft window assembly (100) of any of paragraphs C1-C5, wherein the overmolded aero filler (170) forms a closed ring centered about a/the central axis (26) defined by the window frame (102).

C7. The aircraft window assembly (100) of any of paragraphs C1-C6, wherein the overmolded aero filler (170) extends from an/the inside edge (130) of the base (104) towards an/the intersection (138) of the skirt portion (110) and the circumferential flange portion (108).

C8. The aircraft window assembly (100) of any of paragraphs C1-C7, wherein at least a portion of the overmolded aero filler (170) is molded to the skirt portion (110) immediately opposed to the support surface (112) of the skirt portion (110).

C9. The aircraft window assembly (100) of any of paragraphs C1-C9, wherein the overmolded aero filler (170) is configured to stiffen the skirt portion (110).

C10. The aircraft window assembly (100) of any of paragraphs C1-C9, wherein the overmolded aero filler (170) comprises an exterior surface (172) that is configured to face a/the region (24) exterior to the aircraft (10), and wherein the exterior surface (172) of the overmolded aero filler (170) extends at a deflection angle (174) relative to the exterior face (116) of the skirt portion (110), and wherein a magnitude of the deflection angle (174) is at least substantially the same as that of the ramp angle (124).

C11. The aircraft window assembly (100) of any of paragraphs C1-C10, wherein the overmolded aero filler (170) is dimensioned and shaped such that a/the exterior surface (172) of the overmolded aero filler (170) extends at least substantially parallel to, and optionally aligned with, a skin exterior surface (20) of the aircraft skin (12).

C12. The aircraft window assembly (100) of any of paragraphs C-C11, wherein at least a substantial portion of, and optionally an entirety of, the skirt portion (110) extends at the ramp angle (124) relative to the circumferential flange portion (108).

C13. The aircraft window assembly (100) of any of paragraphs C-C12, wherein the ramp angle (124) is at least one of at least 10°, at least 15°, at least 18°, at least 20°, at least 22°, at least 24°, at least 26°, at least 28°, at least 30°, at least 35°, at most 15°, at most 18°, at most 20°, at most 22°, at most 24°, at most 26°, at most 28°, at most 30°, at most 35°, at most 40°, at most 45°, and at most 50°.

C14. The aircraft window assembly (100) of any of paragraphs C1-C13, wherein the overmolded aero filler (170) comprises a wedge-shaped cross-sectional shape.

C15. The aircraft window assembly (100) of any of paragraphs C1-C13, wherein the support surface (112) of skirt portion extends at the ramp angle (124) relative to circumferential flange portion (108).

D. The window frame (102) of any of paragraphs A1-C15.

E. An aircraft (10) comprising a plurality of the aircraft window assemblies (100) of any of paragraphs A-C15 mounted about a plurality of window apertures (14) defined in the aircraft skin (12) of the aircraft (10).

F. A method of forming the window frame (102) of paragraph D, the method comprising:
stamp-forming the base (104) of the window frame (102) from a sheet of the continuous fiber reinforced thermoplastic composite; and
overmolding the at least one overmolded feature (120) on the base (104).

F1. The method of paragraph F, wherein the overmolding comprises welding an overmolding material from which the at least one overmolded feature (120) is formed with the continuous fiber reinforced thermoplastic composite of the base (104).

F1.1 The method of paragraph F1, wherein the overmolding material comprises an/the overmolding matrix material and optionally an/the reinforcing elements embedded in the overmolding matrix material, and wherein the welding comprises heating the overmolding material above its melting point and intermingling polymer chains of the overmolding matrix material with those of the continuous fiber reinforced thermoplastic composite of the base (104).

F2. The method of any of paragraphs F-F1.1, wherein the overmolding comprises molding the at least one overmolded feature (120) along a desired region of the base (104).

F2.1. The method of any of paragraphs F-F2, wherein the overmolding comprises: positioning an overmolding die in contact with the base (104) such that an embossed template for the at least one overmolded feature (120) defined in the overmolding die interfaces the desired region of the base (104); extruding a/the overmolding material from which the at least one overmolded feature (120) is formed into the embossed template such that the overmolding material fills the embossed template and contacts the desired region of the base (104); and welding the overmolded material with the base (104) along the desired region of the base (104).

F2.1.1. The method of paragraph F2.1, wherein the welding comprises melting at least the desired region of the base (104).

F2.2. The method of any of paragraphs F2-F2.1.1, wherein the at least one overmolded feature (120) comprises a/the overmolded protruding rib (140), and wherein the desired region of the base (104) comprises a/the ring extending along the exterior face (116) of the base (104).

F2.3. The method of any of paragraphs F2-F2.2, wherein the at least one overmolded feature (120) comprises a/the overmolded aero filler (170), and wherein the desired region of the base (104) extends circumferentially about an/the interior face (114) of the skirt portion (110) from a/the inside edge (130) of the base (104) to a fixed distance from the inside edge (130).

F2.4. The method of any of paragraphs F2-F2.3, wherein the at least one overmolded feature (120) comprises an/the inside edge overmold (134) and wherein the desired region comprises an/the inside edge (130) of the base (104).

F2.5. The method of any of paragraphs F2-F2.4, wherein the at least one overmolded feature (120) comprises an outside edge overmold (136), and wherein the desired region comprises a/the outside edge (132) of the base (104).

F2.6. The method of any of paragraphs F2-F2.5, wherein the at least one overmolded feature (120) is at least one of a plurality of overmolded features (120), and wherein the overmolding comprises overmolding the plurality of overmolded features (120) on the base (104).

F3. The method of any of paragraphs F-F2.1.1, wherein the stamp-forming comprises deflecting the skirt portion (110) from the circumferential flange portion (108) such that the skirt portion (110) extends at a/the ramp angle (124) relative to the circumferential flange portion (108).

F4. The method of any of paragraphs F-F3, wherein the overmolding is performed at least substantially simultaneously with the stamp-forming, wherein the stamp-forming comprises shaping the sheet of continuous fiber reinforced thermoplastic composite with a stamp press, and wherein the overmolding die defines a portion of the stamp press.

F5. The method of paragraph F4, wherein a/the overmolding matrix material is selected to possess a melting point that is at least substantially the same as that of a/the thermoplastic matrix material of the base (104).

F6. The method of any of paragraphs F-F3, wherein the overmolding is performed subsequent to the stamp-forming, and wherein the overmolding matrix material is selected to possess a melting point that is lower than that of the thermoplastic matrix material of the base (104).

G. The window frame of paragraph D formed according to the method of any of paragraphs F-F6.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An aircraft window assembly, comprising:
 a window frame configured to support a window pane on an aircraft skin around a circumference of a window aperture defined in the aircraft skin and to align the window pane with the window aperture, wherein the window frame comprises:
 a base formed of a continuous fiber reinforced thermoplastic composite, wherein the base is ring-shaped and defines a central aperture, and wherein the base comprises:
  a circumferential flange portion defining a radial exterior of the base and configured to support the base on the aircraft skin surrounding the window aperture; and
  a skirt portion extending radially inwardly from the circumferential flange portion and surrounding the central aperture, wherein the skirt portion diverges from the circumferential flange at a single bend, and wherein the skirt portion is non-planar with the circumferential flange portion and comprises a support surface for supporting the window pane of the aircraft window assembly; and
 at least one overmolded feature molded to the base.

2. The aircraft window assembly of claim 1, further comprising a plurality of window frame fastener bores extending through and spaced-apart around the circumferential flange portion and configured to receive a respective plurality of window frame fasteners to retain the window frame to the aircraft skin, wherein the at least one overmolded feature comprises a plurality of overmolded protrusions, wherein each overmolded protrusion is molded atop a window frame fastener bore of the plurality of window frame fastener bores, and wherein each overmolded protrusion is configured to receive a window frame fastener receiver, and wherein each window frame fastener receiver is configured to receive and engage a window frame fastener of the plurality of window frame fasteners.

3. The aircraft window assembly of claim 1, wherein the continuous fiber reinforced thermoplastic composite of the base comprises a thermoplastic matrix material and at least one layer of unidirectional continuous fibers or woven continuous fibers embedded in the thermoplastic matrix material, wherein the at least one overmolded feature is formed of an overmolding matrix material, and wherein the overmolding matrix material is selected to be compatible with the thermoplastic matrix material such that polymer chains of the overmolding matrix material intermingle with those of the thermoplastic matrix material.

4. The aircraft window assembly of claim 1, wherein the base comprises an interior face that is configured to face an aircraft interior of the aircraft and an exterior face that is configured to face a region exterior to the aircraft, wherein the exterior face of the circumferential flange portion is configured to contact aircraft skin, and wherein the interior face of the skirt portion comprises the support surface of the skirt portion, wherein the at least one overmolded feature comprises an overmolded protruding rib molded along the interior face of the base, wherein the aircraft window assembly further comprises a plurality of fastener receivers disposed along the overmolded protruding rib and configured to couple a pane retention system to the window frame.

5. The aircraft window assembly of claim 4, further comprising the pane retention system, wherein the pane retention system comprises a plurality of pane retention members configured to press the window pane against the support surface of the skirt portion, wherein each pane retention member of the plurality of pane retention members comprises a pane-contacting end region configured to engage the window pane and a fastener-receiving region configured to couple the pane retention member to a fastener coupled to a fastener receiver of the plurality of fastener receivers disposed along the overmolded protruding rib.

6. The aircraft window assembly of claim 4, wherein the overmolded protruding rib comprises a plurality of radially-bulged sections that each comprise an outermost radial dimension that is greater than that of a remainder of the overmolded protruding rib, and wherein the plurality of fastener receivers are disposed along the plurality of radially bulged sections.

7. The aircraft window assembly of claim 1, wherein the skirt portion extends at a ramp angle relative to the circumferential flange portion.

8. The aircraft window assembly of claim 7, wherein the ramp angle is at least 10° and at most 50°.

9. The aircraft window assembly of claim 7, wherein at least a substantial portion of the skirt portion extends at the ramp angle relative to the circumferential flange portion.

10. The aircraft window assembly of claim 7, wherein the base comprises an interior face that is configured to face an aircraft interior of the aircraft and an exterior face that is configured to face a region exterior to the aircraft, wherein the exterior face of the circumferential flange portion is configured to contact aircraft skin, and wherein the interior face of the skirt portion comprises the support surface of the skirt portion, wherein the at least one overmolded feature comprises an overmolded aero filler molded along a/the exterior face of the skirt portion, and wherein the overmolded aero filler is configured to be positioned within a gap between the skirt portion and the aircraft skin.

11. The aircraft window assembly of claim 10, wherein the gap is at least partially defined between the exterior face of the skirt portion and an aperture-facing edge of the aircraft skin, and wherein a volume of the gap decreases with respect to the ramp angle.

12. The aircraft window assembly of claim 10, wherein the overmolded aero filler extends from an inside edge of the base towards an intersection of the skirt portion and the circumferential flange portion.

13. The aircraft window assembly of claim 10, wherein the overmolded aero filler is dimensioned and shaped to at least substantially fill the gap.

14. The aircraft window assembly of claim 10, wherein the overmolded aero filler comprises an exterior surface that is configured to face the region exterior to the aircraft, and wherein the exterior surface of the overmolded aero filler extends at a deflection angle relative to the exterior face of the skirt portion, and wherein a magnitude of the deflection angle is at least substantially the same as that of the ramp angle.

15. The aircraft window assembly of claim 14, wherein the overmolded aero filler is dimensioned and shaped such that the exterior surface of the overmolded aero filler extends at least substantially parallel to, and optionally aligned with, a skin exterior surface of the aircraft skin.

16. A method of forming the window frame of the aircraft window assembly of claim 1, the method comprising:
   stamp-forming the base of the window frame from a sheet of the continuous fiber reinforced thermoplastic composite; and
   overmolding the at least one overmolded feature on the base.

17. The method of claim 16, wherein the overmolding comprises molding the at least one overmolded feature along a desired region of the base, and wherein the overmolding further comprises:
   positioning an overmolding die in contact with the base such that an embossed template for the at least one overmolded feature defined in the overmolding die interfaces the desired region of the base;
   extruding an overmolding material from which the at least one overmolded feature is formed into the embossed template such that the overmolding material fills the embossed template and contacts the desired region of the base; and
   welding the overmolded material with the base along the desired region of the base.

18. The method of claim 16, wherein the overmolding comprises molding the at least one overmolded feature along a desired region of the base, wherein the at least one overmolded feature comprises an overmolded protruding rib, and wherein the desired region of the base comprises a ring extending along an exterior face of the base.

19. The method of claim 16, wherein the overmolding comprises molding the at least one overmolded feature along a desired region of the base, wherein the at least one overmolded feature comprises an overmolded aero filler, and wherein the desired region of the base extends circumferentially about an interior face of the skirt portion from an inside edge of the base to a fixed distance from the inside edge.

20. The method of claim 16, wherein the stamp-forming comprises deflecting the skirt portion from the circumferential flange portion such that at least a substantial portion of the skirt portion extends at a ramp angle relative to the circumferential flange portion, and wherein the ramp angle is 10° and at most 50°.

* * * * *